F. McCLUSKEY.
JOINT FOR TUBULAR PILING.
APPLICATION FILED JAN. 18, 1912.
1,051,427.
Patented Jan. 28, 1913.
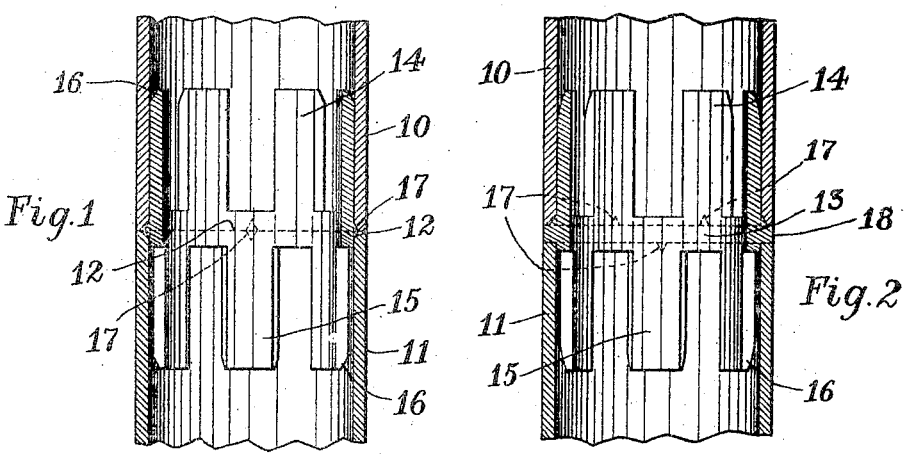
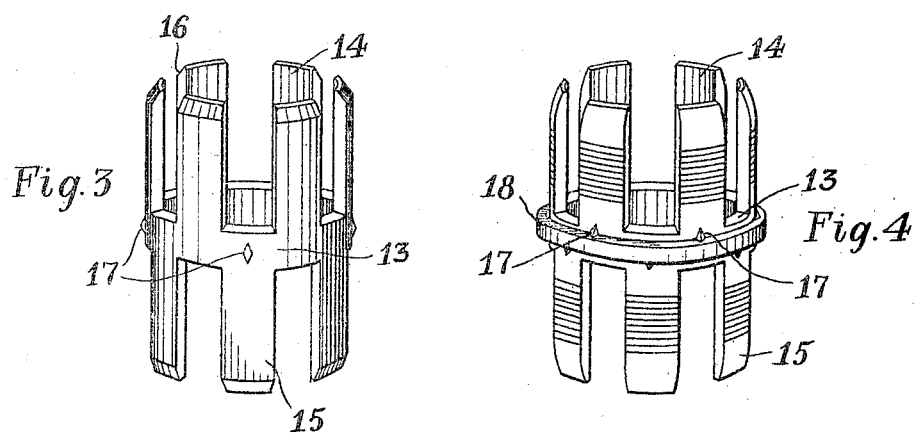
WITNESSES:
David J. Walsh
Katharine C. Mead
Frank McCluskey
INVENTOR
BY Wilkinson, Fisher, Witherspoon and MacKaye
ATTORNEYS

UNITED STATES PATENT OFFICE.

FRANK McCLUSKEY, OF NEW YORK, N. Y.

JOINT FOR TUBULAR PILING.

1,051,427. Specification of Letters Patent. Patented Jan. 28, 1913.

Application filed January 18, 1912. Serial No. 671,803.

*To all whom it may concern:*

Be it known that I, FRANK MCCLUSKEY, a citizen of the United States, residing in the city of New York, in the county of New York and State of New York, have invented certain new and useful Improvements in Joints for Tubular Piling; and I do hereby declare the following to be a full, clear, and exact description of the invention, such as will enable others skilled in the art to which it appertains to make and use the same.

My invention relates to a simple and easily adjusted device for firmly connecting successive sections of tubular piping when in process of driving the same into the ground, either for piles or for driven wells.

The device is shown in a preferred form in the accompanying drawings wherein—

Figures 1 and 2 are median vertical sections of two modified forms of the improved device, and Figs. 3 and 4 are perspective views of the same respectively.

The abutting sections of pipe are shown at 10 and 11.

The joining means consists of a sleeve, preferably made of malleable iron, but in any case having a suitable resiliency, which sleeve is composed of a middle ring 12, and projections 14, 15, extending in opposite directions from said ring. I prefer to taper the extremities of these projections as shown at 16, and I also prefer to arrange them in "staggered" relation, that is to say, so that the upwardly extending projections are located opposite the spaces between the downwardly extending projections. This arrangement is not, however, essential.

I prefer to provide the ring portion 12 with laterally projecting hard and sharp cutting points 17. These points, when located at the line of abutment, as shown in Figs. 1 and 2, serve both to limit the extent to which the spring sleeve is pushed into the lower pipe 11, preparatory to adjusting the upper pipe 10 over it, and also to firmly unite and lock together the two sections. This latter function is carried out by the points acting to cut or bite into the surfaces of the abutting pipes, (being of harder material) as shown in Fig. 1.

In the modified form shown in Figs. 2 and 4, a collar 18 projects all around the ring 12 and lies between the abutting pipes. In this form, the cutting points 17 are preferably located above and below the collar at the respective bases of the longitudinal spring projections 14 and 15.

The sleeve may be suitably roughened, if desired, as shown in Fig. 4.

Various changes may be made in this device without departing from the scope of my invention, and I do not limit myself to the details herein shown and described.

What I claim is—

A joining sleeve for tubular piles and the like comprising a middle ring having oppositely extended resilient projections adapted to hug the interior surfaces of abutting pipe sections, said projections being arranged in staggered relation and each having a hard, sharp cutting point near its base on said ring portion, substantially as described.

In testimony whereof, I affix my signature, in presence of two witnesses.

FRANK McCLUSKEY.

Witnesses:
 H. S. MACKAYE,
 KATHARINE C. MEAD.